(12) United States Patent
Cheng (10) Patent No.: US 11,499,660 B2
(45) Date of Patent: Nov. 15, 2022

(54) HOSE CONNECTING DEVICE

(71) Applicant: Ya-Shan Cheng, Lukang Township, Changhua County (TW)

(72) Inventor: Ya-Shan Cheng, Lukang Township, Changhua County (TW)

(*) Notice: Subject to any disclaimer, the term of this patent is extended or adjusted under 35 U.S.C. 154(b) by 231 days.

(21) Appl. No.: 17/061,458

(22) Filed: Oct. 1, 2020

(65) Prior Publication Data

US 2022/0107041 A1   Apr. 7, 2022

(51) Int. Cl.
*F16L 33/22*      (2006.01)
*F16L 33/207*     (2006.01)
*F16L 19/02*      (2006.01)
*F16L 19/025*     (2006.01)

(52) U.S. Cl.
CPC .................................. *F16L 33/224* (2013.01)

(58) Field of Classification Search
CPC ... F16L 33/224; F16L 19/0237; F16L 19/025; F16L 33/2071
See application file for complete search history.

(56) References Cited

U.S. PATENT DOCUMENTS

| | | | | |
|---|---|---|---|---|
| 3,799,589 | A * | 3/1974 | Boelkins | F16L 27/0832 285/321 |
| 6,217,082 | B1 * | 4/2001 | Orcutt | F16L 27/08 285/272 |
| 6,409,227 | B1 * | 6/2002 | Lu | F16L 27/0824 285/276 |
| 6,485,064 | B1 * | 11/2002 | Davidson | F16L 33/2076 285/353 |
| 2006/0237964 | A1 * | 10/2006 | Nielson | F16L 27/0808 285/272 |
| 2007/0075541 | A1 * | 4/2007 | Wu | E03C 1/0409 285/272 |

* cited by examiner

*Primary Examiner* — James M Hewitt, II (57) ABSTRACT

A hose connecting device has a connector, an inner locking ring, an outer connector and a tubal body. The connector has an insertion section and an engaging section, the engaging section has a size greater than the insertion section, and the engaging section further has a stopping ring at a top end. The inner locking ring is jacketed onto the engaging section of the connector and abutting the stopping ring of the connector. The inner locking ring has an outer threaded section and an abutting portion disposed at a bottom end of the inner locking ring. The outer connector has one of a female connector and a male connector, and a channel, the channel has a positioning step at a middle portion, an inner threaded section disposed below the positioning step of the channel. The tubal body is jacketed onto the insertion section of the connector.

8 Claims, 9 Drawing Sheets

HOSE CONNECTING DEVICE

BACKGROUND OF INVENTION

Field of Invention

The present invention relates to a hose connecting device, and more particularly to a rotatable hose connecting device.

Description of Related Art

Figure 9:
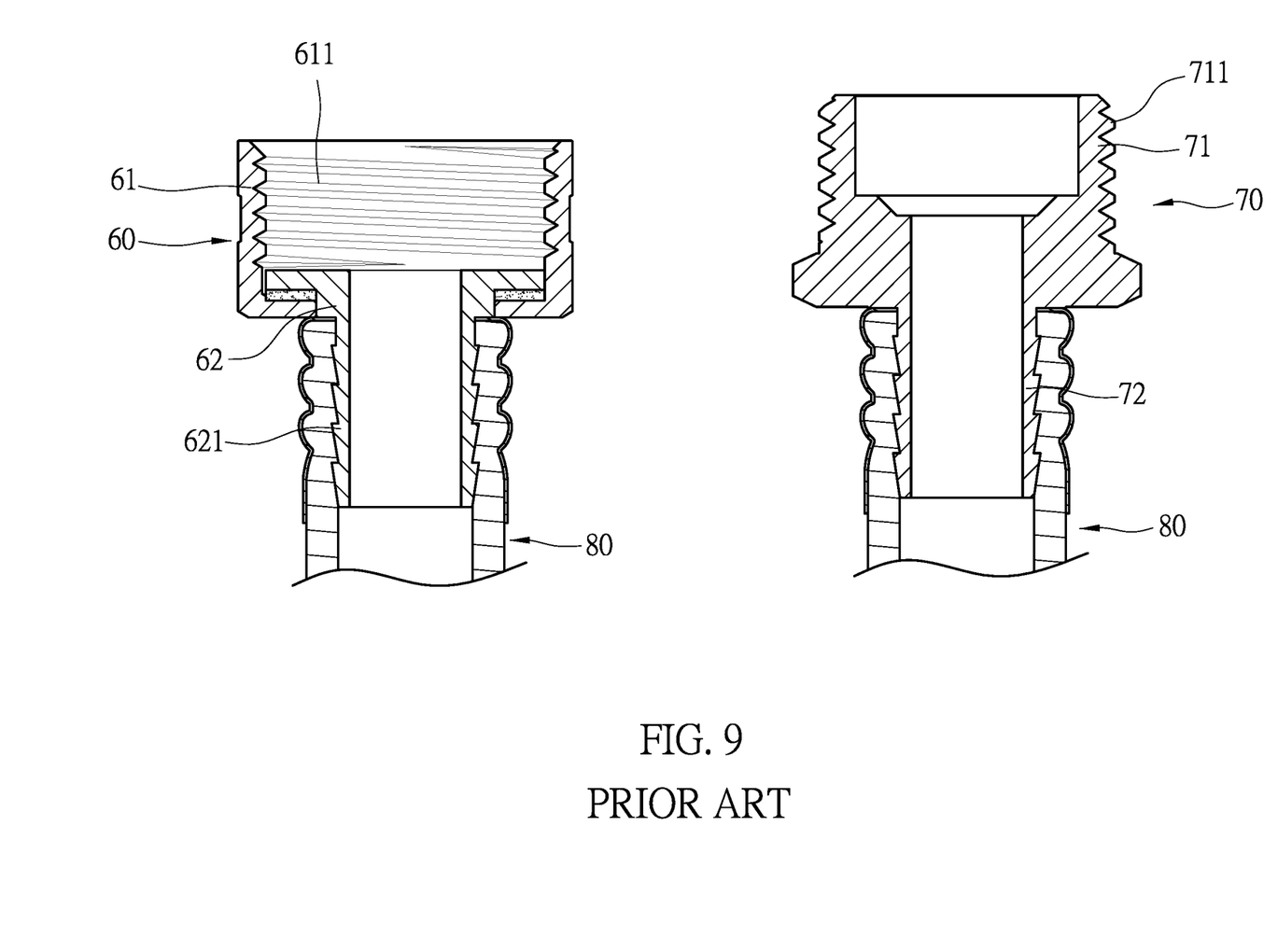
FIG. 9 is a schematic drawing of prior art.
Figure 10:
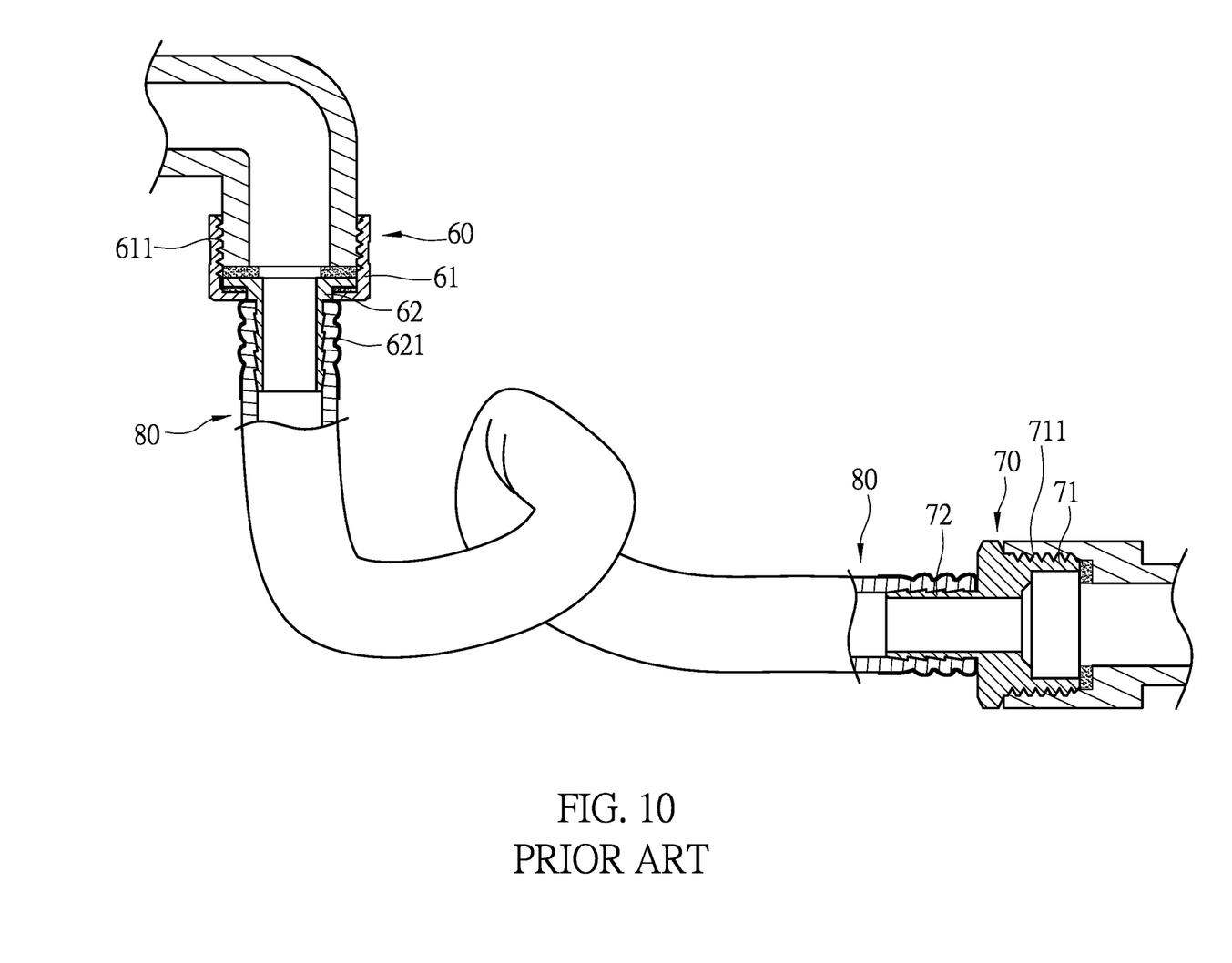
FIG. 10 is a schematic drawing of the use of prior art

A conventional connector structure of water pipe is shown in FIGS. 9 and 10. It mainly includes a female connector 60, a male connector 70 and a tubal body 80. The female connector 60 includes an assembling sleeve 61 and a connector 62. The assembling sleeve 61 is provided with a through hole, passes through the inserting section 621 of the connector 62, and is inserted into one end of a tubal body 80. The assembling sleeve 61 is further provided with an inner threaded section 611. The male connector 70 has an assembling portion 71 and an inserting portion 72, and the assembly portion 71 is provided with the outer threaded section 711. Furthermore, the inserting portion 72 is inserted at the other end of a tubal body 80 to assemble the female connector 60 and the male connector 70 on both ends of the tubal body 80 respectively.

When the user wants to connect the tubal body 80 to a faucet and a water outlet unit, the assembling sleeve 61 of the female connector 60 is inserted and fixed to the end of the tubal body 80 through the connector 62, the assembling sleeve 61 is inserted and fixed. The assembling sleeve 61 is tightly pressed by the connector 62 and difficult to rotate freely, in order to assemble onto the faucet, the connector 62 pushes inward and squeezes the assembling sleeve 61 even more, resulting in the assembling sleeve 61 cannot rotate at all. Meanwhile, the tubal body 80 might be rotated and wound at the same time during the assembly process, which causes assembly problems. Moreover, the assembly part 711 and the inserting portion 72 of the male connector 70 are integrally formed. Similarly, when the inserting portion 72 is inserted and fastened into one end of the tubal body 80, the assembly part 711 is fixed with the inserting section 72 and cannot rotate freely when the tubal body 80 is rotated and wound during the assembly process, resulting in assembly troubles. In summary, the prior art connector often causes the tubal body 80 to become knotted and entangled, which not only stops water output and also increases the difficulty of winding the tubal body 80 without knots and entanglement. Also, the resistance caused by entanglement increases the internal pressure of the tubal body 80 and makes the tubal body 80 easy to burst or the tubal body 80 to be detached from the water supply equipment.

Therefore, it is desirable to provide a hose connecting device to mitigate and/or obviate the aforementioned problems.

SUMMARY OF INVENTION

An objective of present invention is to provide a hose connecting device, which is capable of improving the above-mention problems.

In order to achieve the above mentioned objective, a hose connecting device has a connector, an inner locking ring, an outer connector and a tubal body. The connector has an insertion section and an engaging section, the engaging section has a size greater than the insertion section, and the engaging section further has a stopping ring at a top end. The inner locking ring is jacketed onto the engaging section of the connector and abutting the stopping ring of the connector. A lubricating member is sandwiched between the inner locking ring and the stopping ring, the inner locking ring has an outer threaded section and an abutting portion disposed at a bottom end of the inner locking ring and has a size greater than a size of the outer threaded section. The outer connector has one of a female connector and a male connector, and a channel, the channel has a positioning step at a middle portion, an inner threaded section disposed below the positioning step of the channel. The tubal body is jacketed onto the insertion section of the connector.

Other objects, advantages, and novel features of invention will become more apparent from the following detailed description when taken in conjunction with the accompanying drawings.

DETAILED DESCRIPTION OF PREFERRED EMBODIMENT

Figure 1:
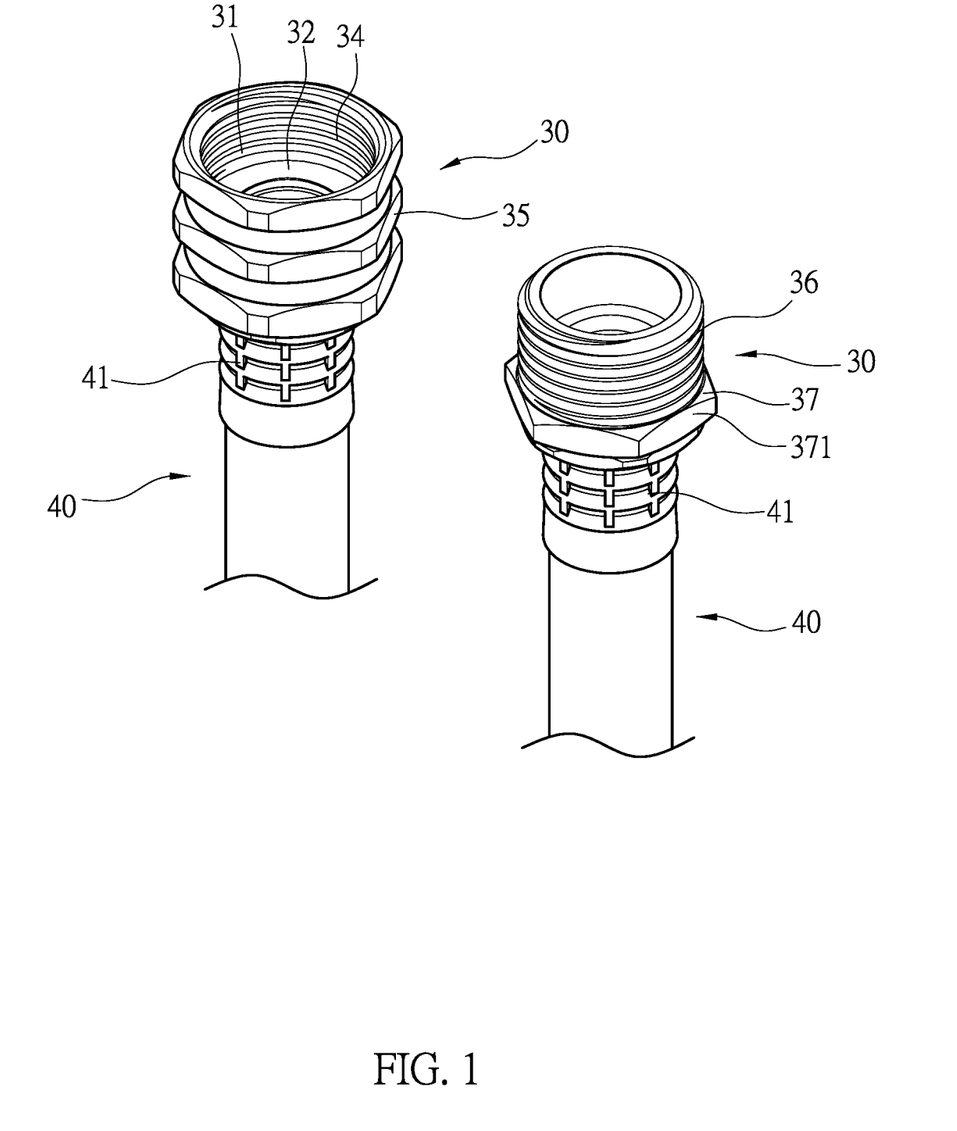
FIG. 1 is a three-dimensional view of a preferred embodiment according to the present invention.
Figure 2:
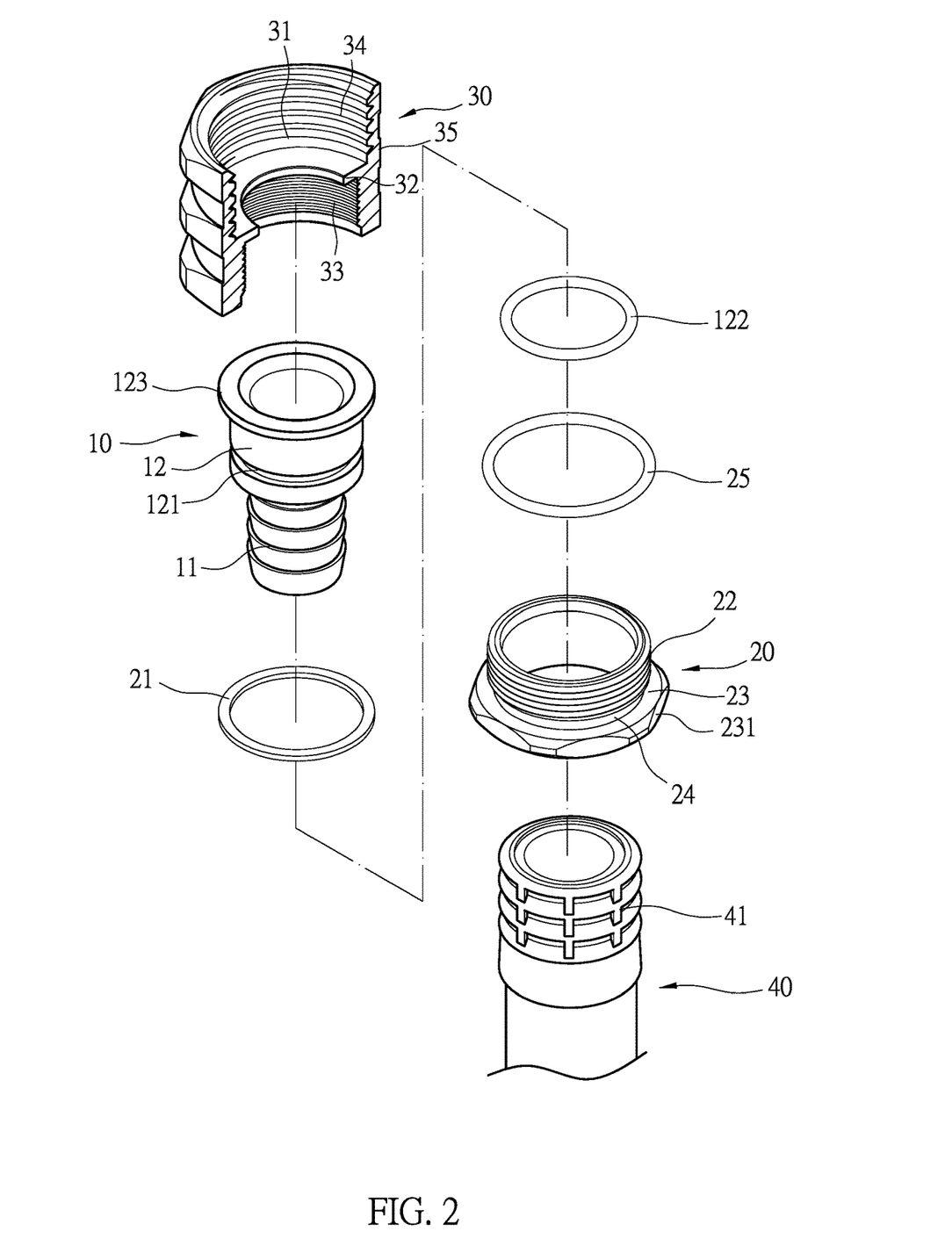
FIG. 2 is an exploded view of the connecting device with the female connector of the preferred embodiment according to the present invention.
Figure 4:
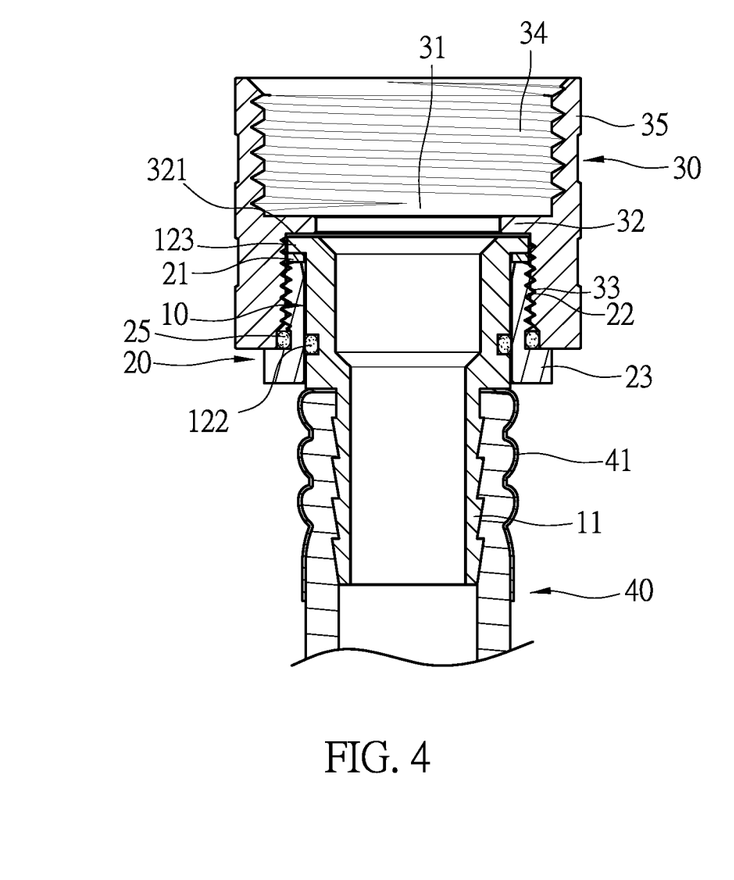
FIG. 4 is a sectional view of the structure of the connecting device with the female connector of the preferred embodiment according to the present invention.

Please refer to FIG. 1, FIG. 2 and FIG. 4. A hose connecting device comprises: a connector 10, an inner locking ring 20 and an outer connector 30. The connector 10 has an inserting section 11 and an engaging section 12. The inserting section 11 jackets onto an end of a tubal body 40. The engaging section 12 has a size greater than the insertion section 11, the engaging section 12 has a first circular groove 121 sleeved with a corresponding washer 122 and a stopping ring 123 at a top end. The inner locking ring 20 is jacketed onto the engaging section 12 of the connector 10 and abutting the stopping ring 123 of the connector 10. A lubricating member 21 is sandwiched between the inner locking ring 20 and the stopping ring 123, the inner locking ring 20 comprises an outer threaded section 22 and an abutting portion 23 disposed at a bottom end of the inner locking ring 20 and having a size greater than a size of the outer threaded section 22. Moreover, a circumference 231 of the abutting portion 23 of the inner locking ring 20 is shaped as a polygonal nut. The outer threaded section 22 further comprising a second circular groove 24 with a corresponding washer 25 adjacent to the abutting portion 23. The outer connector 30 has a channel 31, the channel 31 has a positioning step 32 at a middle portion, and an inner threaded section 33 disposed below the positioning step 32 of the channel 31. By the engagement of the inner threaded section 33 and the outer threaded section 22 of the inner locking ring 20, a gap 321 exists between the positioning step 32 and the stopping ring 123 of the connector 10, such that the outer connector 30 and the inner locking ring 20 are capable of relative rotation around the engaging section 12 of the connector 10.

Figure 3:
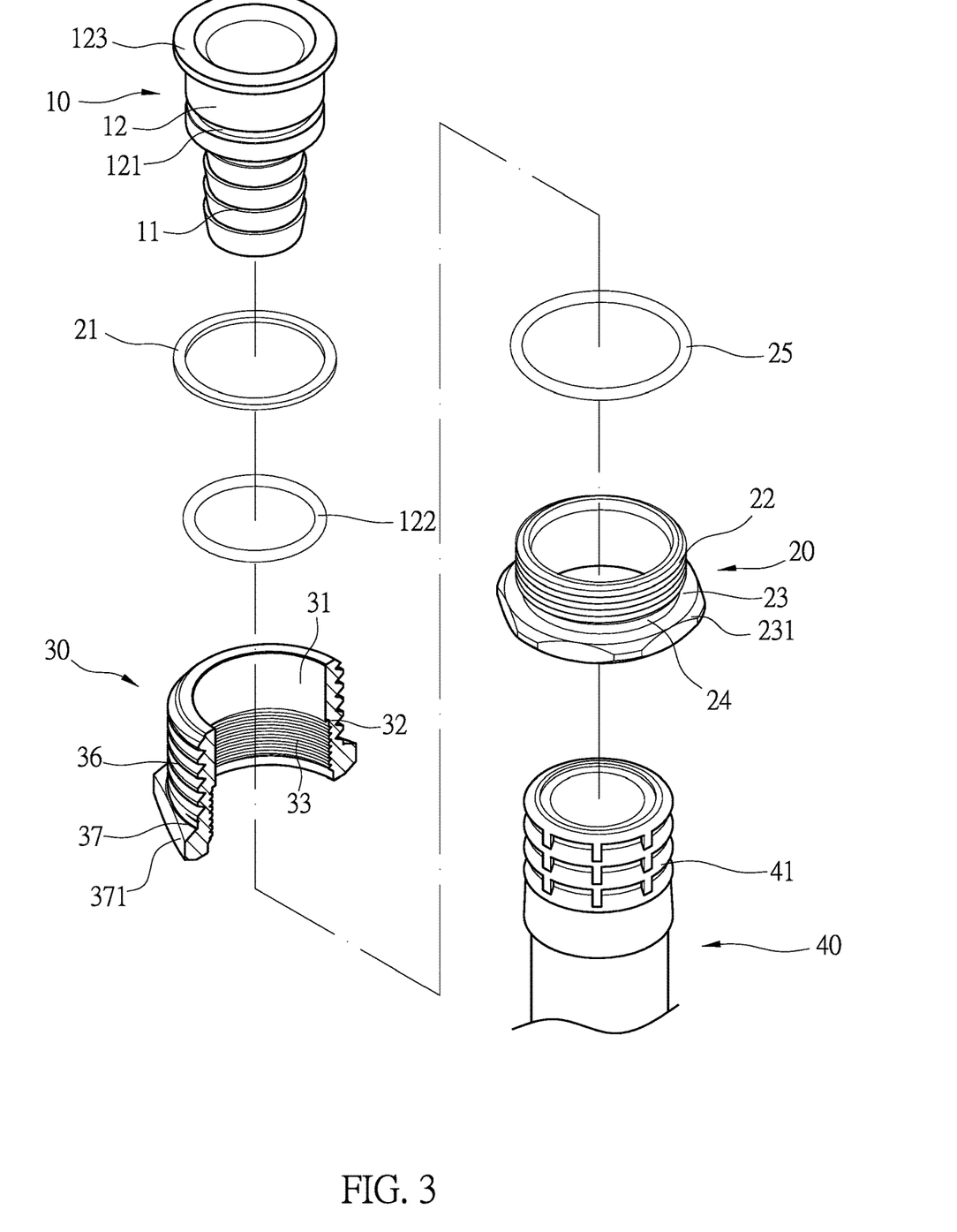
FIG. 3 is an exploded view of the connecting device with the male connector of the preferred embodiment according to the present invention.
Figure 5:
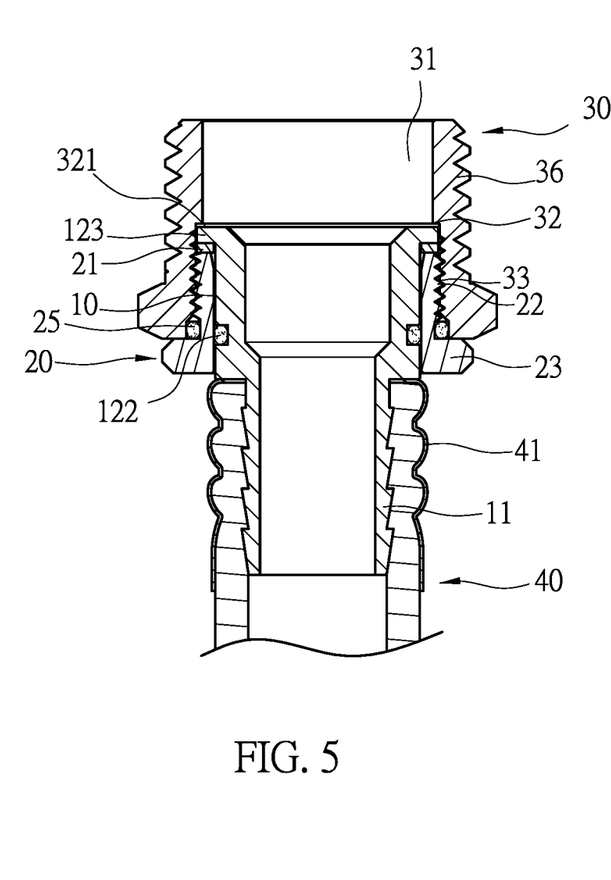
FIG. 5 is an exploded view of the connecting device with the male connector head of the preferred embodiment according to the present invention.

The outer connector 30 further comprises one of a female connector and a male connector. The female connector comprises an inner threaded section 34 above the positioning step 32 of the channel 31, and a circumference 35 of the outer connector 30 is shaped as a polygonal nut. As shown in FIGS. 1, 3 and 5, the male connector of the outer connector 30 comprises an outer threaded section 36 and an abutting ring 37 below the outer threaded section 36, and a circumference 371 of the abutting ring 37 is shaped as a polygonal nut.

Furthermore, the lubricating member is a washer comprising Teflon.

For the assembly of the structure, please refer to FIGS. 2, 3, 4, and 5. The engaging section 12 of the connector 10 is sleeved with the washer 122 onto the circular groove 121, the lubricating member 21 is placed onto the engaging section 12 and rests against the stopping ring 123, the inner locking ring 20 is put on the engaging section 12 of the connector 10 from bottom to top, and the top of the inner locking ring 20 rests against the lubricating member 21. The lubricating member 21 provides effect between the top end of the inner locking ring 20 and the connector 10. The inner threaded section 33 of the channel 31 of the outer connector 30 engages with the outer threaded section 22 of the inner locking ring 20 to assemble the outer connector 30 onto the engaging section 12 of the connector 10, and the gap 321 is formed between the positioning step 32 of the outer connector 30 and the stopping ring 123 of the connector 10. Therefore, the inner locking ring 20 and the outer connector 30 have a rotation clearance through the lubricating member 21, the gap 321 and the connector 10, and make the outer connector 30 and the inner locking ring 20 have relative rotation abilities. In addition, the inserting section 11 of the connector 10 is sleeved on either ends of the tubal body 40, the outer diameter of the end of the tubal body 40 is further crowned with a metal sleeve 41, and the metal sleeve 41 tightly fixes the tubal body 40 onto the inserting section 11 of the connector 10 to complete the assembly of the tubal body 40.

Figure 6:
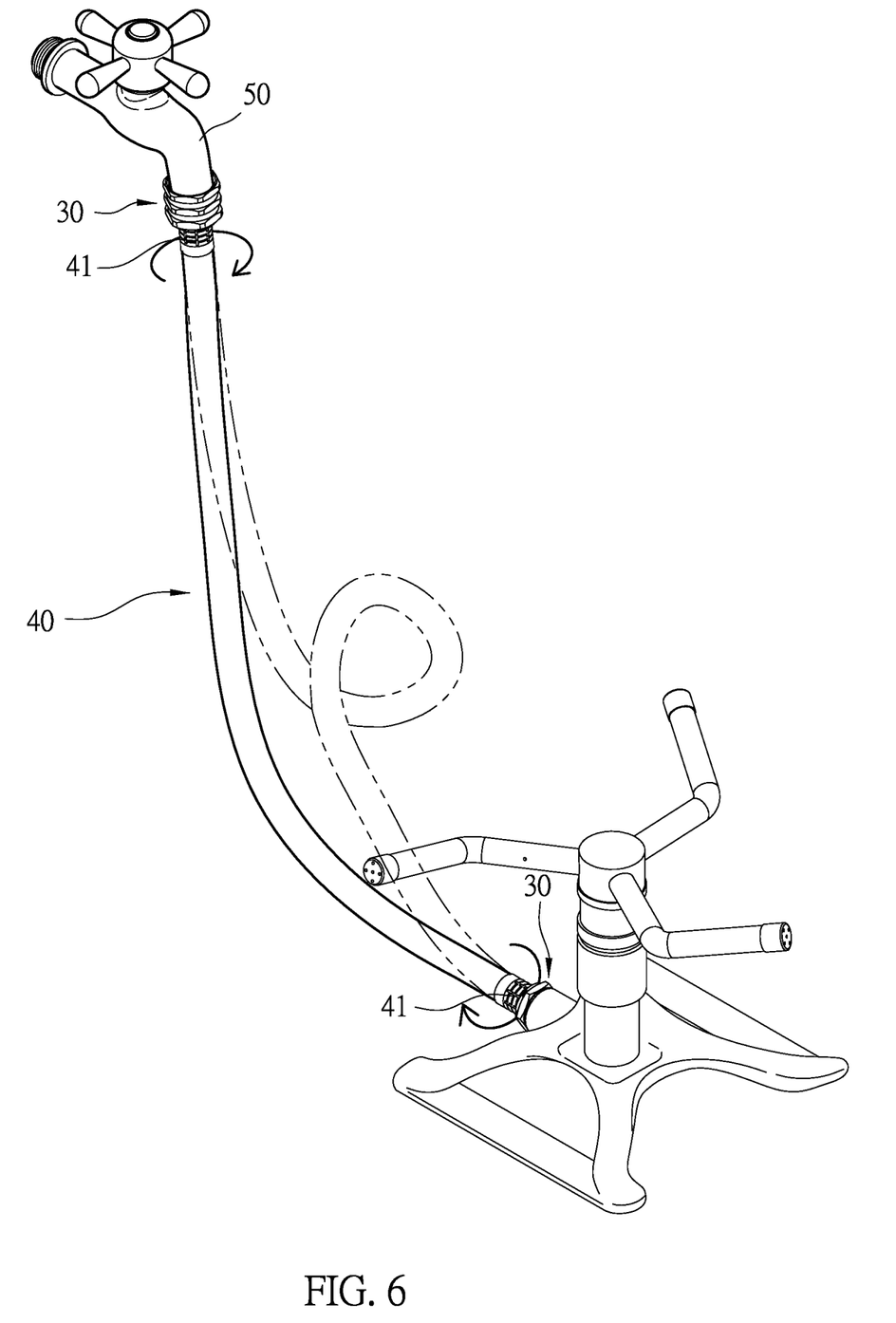
FIG. 6 is a schematic drawing of the assembly and use state of the preferred embodiment according to the present invention.
Figure 7:
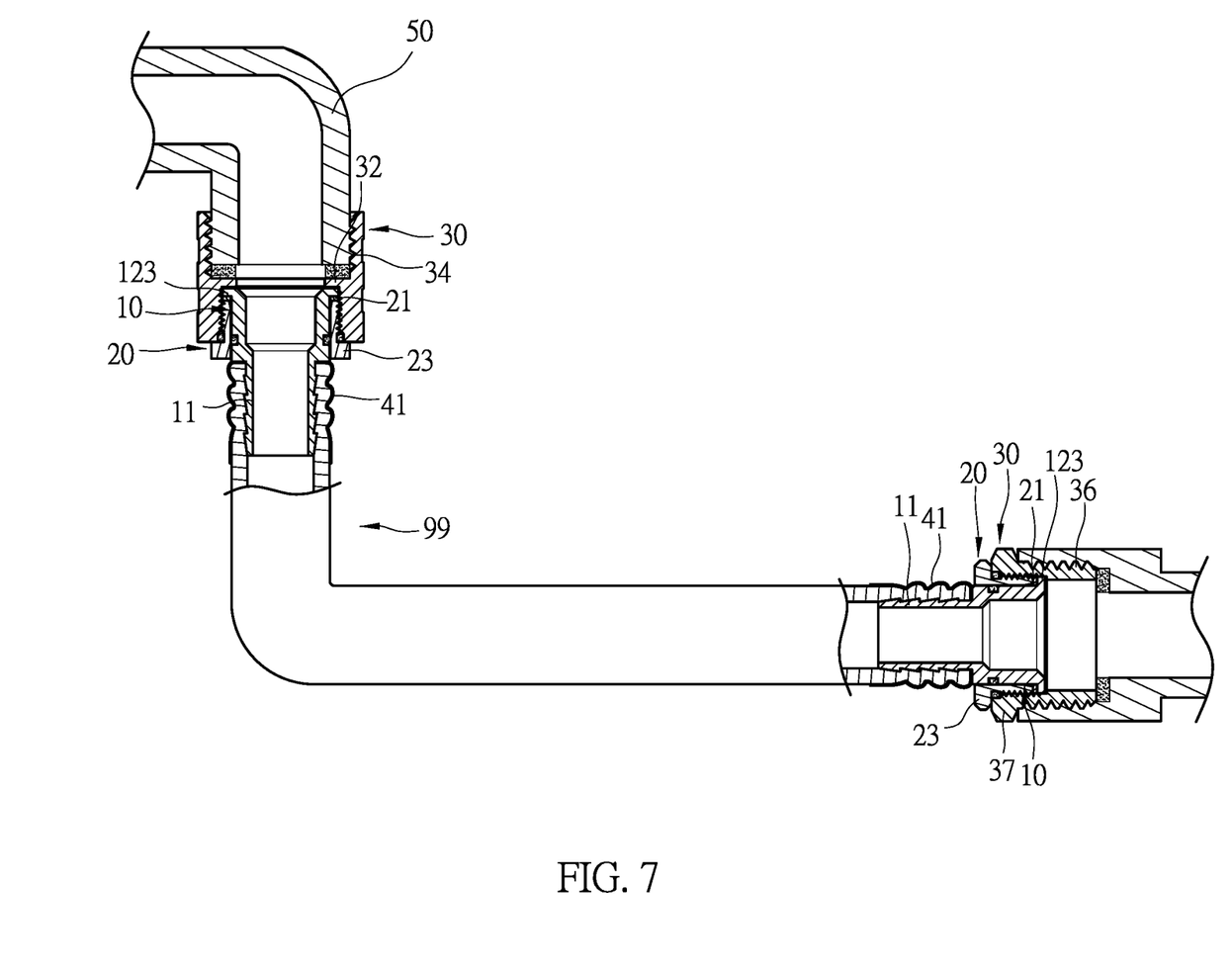
FIG. 7 is a partial enlarged cross-sectional view of the assembly of the preferred embodiment according to the present invention.

For the actual state of its structure, please refer to FIGS. 6 and 7. The tubal body 40 may be mounted with the female connector of the connector at one end and the male connector of the connector at the other end. The outer connector 30 with the female connector is installed on an outer threaded section of an output end of a faucet 50 with the internal threaded section 34, because the outer connector 30 mainly utilizes the inner locking ring 20 to secured onto the engaging section 12 of the connector 10, when the faucet 50 is locked with the outer connector 30, the outer connector 30 does not pressed inwardly against the stopping ring 123 of the connector 10, so that the gap 321 between the connector 10 the outer connector 30 is formed, which ensures that the tubal body 40 can rotate freely around the faucet 50. Therefore, the outer connector 30 with the male connector utilizes the outer threaded section 36 to be mounted onto tools such as sprinklers, spray guns, etc. . . . , and the outer connector 30 also uses the inner locking ring 20 to be secured onto the engaging section 12 of the connector 10; and during the assembly process of the application tool, the outer connector 30 does not squeeze inward to push against the stopping ring 123 of the connector 10 to ensure that the application tool can rotate freely on the tubal body 40 through the outer connector 30. Thereby, the outer connector 30 and the inner locking ring 20 are capable of freely rotating around the connector 10 after being assembled, it can prevent the tubal body 40 from twisting and winding during water operation. In addition, the lubricating member 21 between the inner locking ring 20 and the connector 10 further provides the tubal body 40 with the smoothness of free rotation, which helps to improve the usability of the tubal body 40.

Figure 8:
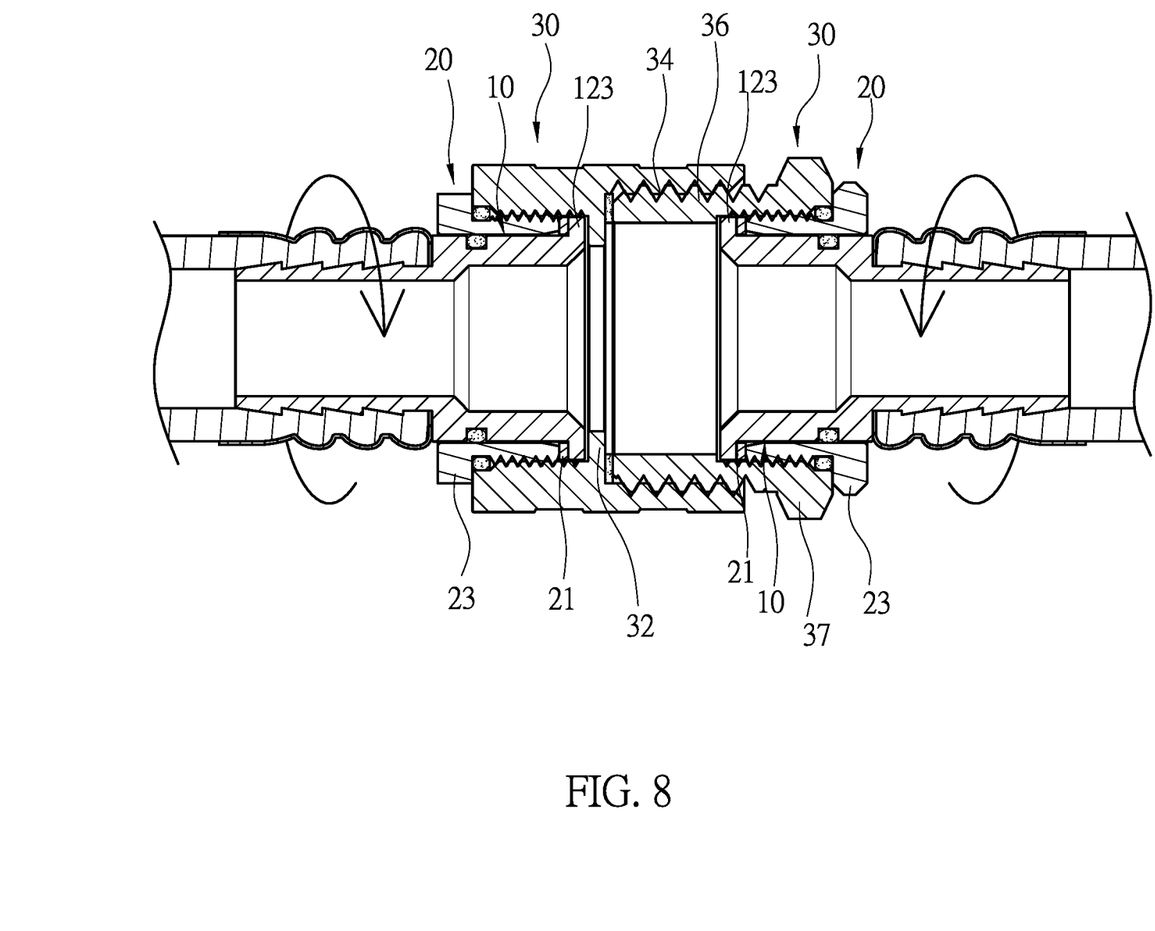
FIG. 8 is a schematic drawing of the tubal body locked and fixed through two connectors according to the present invention.

In addition, when the tubal body 40 needs to be wound and stored after use, please refer to FIG. 8. The hose connecting device on both ends of the tubal body 40 can also be locked to each other through the male connector and the female connector, the outer connector 30 and the inner locking ring 20 can rotate freely on the connector 10, which avoids the tubal body 40 from twisting deformation and help improve the durability of the tubal body 40.

Although the present invention has been explained in relation to its preferred embodiment, it is to be understood that many other possible modifications and variations can be made without departing from the spirit and scope of invention as hereinafter claimed.

What is claimed is:

1. A hose connecting device comprising:
a connector having an insertion section and an engaging section, the engaging section having a size greater than the insertion section, the engaging section further having a stopping ring at a top end;
an inner locking ring jacketed onto the engaging section of the connector and abutting the stopping ring of the connector, a lubricating member sandwiched between the inner locking ring and the stopping ring, the inner locking ring comprising an outer threaded section and an abutting portion disposed at a bottom end of the inner locking ring and having a size greater than a size of the outer threaded section;
an outer connector having one of a female connector and a male connector, and a channel, the channel comprising a positioning step at a middle portion, an inner threaded section disposed below the positioning step of the channel; and
a tubal body jacketed onto the insertion section of the connector;
wherein when the inner threaded section of the channel engages with the outer threaded section of the inner locking ring, a gap exists between the positioning step and the stopping ring of the connector, such that the outer connector and the inner locking ring are capable of relative rotation.

2. The hose connecting device as claimed in claim 1, wherein the engaging section of the connector further comprises a first circular groove, the outer threaded section of the inner locking ring further comprising a second circular groove, and both of the first and second circular grooves have a washer.

3. The hose connecting device as claimed in claim 1, wherein a circumference of the abutting portion of the inner locking ring is shaped as a polygonal nut.

4. The hose connecting device as claimed in claim 1, wherein the lubricating member is a washer comprising PTFE.

5. The hose connecting device as claimed in claim 1, wherein the female connector of the outer connector comprises an inner threaded section above the positioning step of the channel, and a circumference of the outer connector is shaped as a polygonal nut.

6. The hose connecting device as claimed in claim 1, wherein the male connector of the outer connector comprises an outer threaded section and an abutting ring below the outer threaded section.

7. The hose connecting device as claimed in claim 6, wherein a circumference of the abutting ring is shaped as a polygonal nut.

8. The hose connecting device as claimed in claim 1, wherein each end of the tubal body is crowned with a metal sleeve to be secured onto the inserting section of the connector.

* * * * *